US012700427B2

(12) United States Patent
Okamoto

(10) Patent No.: US 12,700,427 B2
(45) Date of Patent: Aug. 4, 2026

(54) DISK DEVICE WITH EXPOSED INNER SURFACE REGIONS FOR IMPROVED COVER COUPLING

(71) Applicants:Kabushiki Kaisha Toshiba, Tokyo (JP); Toshiba Electronic Devices & Storage Corporation, Tokyo (JP)

(72) Inventor: Makoto Okamoto, Kodaira Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 12 days.

(21) Appl. No.: 18/822,273

(22) Filed: Sep. 1, 2024

(65) Prior Publication Data

US 2025/0279119 A1 Sep. 4, 2025

(30) Foreign Application Priority Data

Mar. 1, 2024 (JP) ................................. 2024-031333

(51) Int. Cl.
*G11B 5/82* (2006.01)
*G11B 33/02* (2006.01)
*G11B 33/14* (2006.01)

(52) U.S. Cl.
CPC .............. *G11B 5/82* (2013.01); *G11B 33/027* (2013.01); *G11B 33/1466* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 9,779,779 B1 * | 10/2017 | Okamoto ........... | G11B 33/1446 |
| 9,818,454 B1 * | 11/2017 | Albrecht ........... | G11B 33/1466 |
| 10,672,424 B2 * | 6/2020 | Kato .................. | G11B 33/1486 |
| 10,910,018 B2 | 2/2021 | Terasaki | |
| 11,594,251 B2 * | 2/2023 | Kato .................... | G11B 33/022 |
| 11,615,810 B1 * | 3/2023 | Chan .................... | G11B 33/022 |
| | | | 360/246.2 |
| 12,322,413 B2 * | 6/2025 | Mitsunari ........... | G11B 33/027 |
| 2019/0287573 A1 * | 9/2019 | Terasaki ............... | G11B 33/022 |
| 2020/0082847 A1 * | 3/2020 | Kato ..................... | G11B 5/012 |
| 2020/0090707 A1 * | 3/2020 | Sato ..................... | G11B 25/043 |
| 2021/0272603 A1 * | 9/2021 | Uehara ................ | G11B 33/123 |
| 2024/0170018 A1 * | 5/2024 | Mitsunari ........... | G11B 25/043 |

* cited by examiner

*Primary Examiner* — William J Klimowicz
(74) *Attorney, Agent, or Firm* — Kim & Stewart LLP

(57) ABSTRACT

A disk device includes a magnetic disk, a base, a film, an inner cover, and an outer cover. The base is provided with an internal space, and has a first inner surface surrounding the magnetic disk, a supporting surface connected to an end of the first inner surface in a first direction, a second inner surface further away from a rotation axis of the magnetic disk than the first inner surface and connected to the supporting surface, and an end face connected to an end of the second inner surface in the first direction. The film covers a covered region in the second inner surface and is spaced apart from the end face and an exposed region of the second inner surface. The inner cover is supported by the supporting surface and surrounded by the second inner surface. The outer cover is coupled to a portion of the base.

19 Claims, 3 Drawing Sheets

DISK DEVICE WITH EXPOSED INNER SURFACE REGIONS FOR IMPROVED COVER COUPLING

CROSS-REFERENCE TO RELATED APPLICATION(S)

This application is based upon and claims the benefit of priority from Japanese Patent Application No. 2024-031333, filed Mar. 1, 2024, the entire contents of which are incorporated herein by reference.

FIELD

Embodiments described herein relate generally to a disk device.

BACKGROUND

A disk device such as a hard disk drive (HDD) includes a magnetic disk and a housing that accommodates the magnetic disk. The housing includes, for example, a base, an inner cover that closes an internal space of the base, and an outer cover that covers the inner cover and is welded to an end face of the base.

The surface of the base is generally protected by an electrodeposition-coated film. On the other hand, in the base, the film may be removed in the vicinity of the outer cover, for example, by cutting, to prevent the film from melting during welding. When the width of the end face of the base is reduced by cutting, there is a concern that the strength of welding between the end face and the outer cover may be reduced.

DETAILED DESCRIPTION

Embodiments provide a disk device that can improve the strength of coupling between an end face of a base and an outer cover.

In general, according to one embodiment, a disk device includes a magnetic disk, a base, a film, an inner cover, and an outer cover. The magnetic disk is rotatable around a rotation axis. The base is provided with an internal space in which the magnetic disk is disposed, and has a first inner surface surrounding the magnetic disk, a supporting surface that is connected to an end of the first inner surface in a first direction parallel to the rotation axis, a second inner surface that is further away from the rotation axis than the first inner surface and connected to the supporting surface, and an end face that is connected to an end of the second inner surface in the first direction. The film covers at least a portion of the first inner surface, at least a portion of the supporting surface, and a covered region of the second inner surface, and is spaced apart from the end face and an exposed region of the second inner surface. The inner cover is supported by the supporting surface, is surrounded by the second inner surface, and covers the internal space. The outer cover is coupled to at least a portion of the base and covers the inner cover.

One embodiment will be described below with reference to FIGS. 1 to 3. In this specification, elements of the embodiment and a description of the elements may be expressed in various ways. The elements and the description thereof are examples and are not limited by the expressions in this specification. The elements may also be specified by names different from those in this specification. The elements may also be described using expressions different from the expressions in this specification.

In the following description, "suppress" is defined as, for example, preventing the occurrence of an event, effect, or influence, or reducing the degree of an event, effect, or influence.

Figure 1:
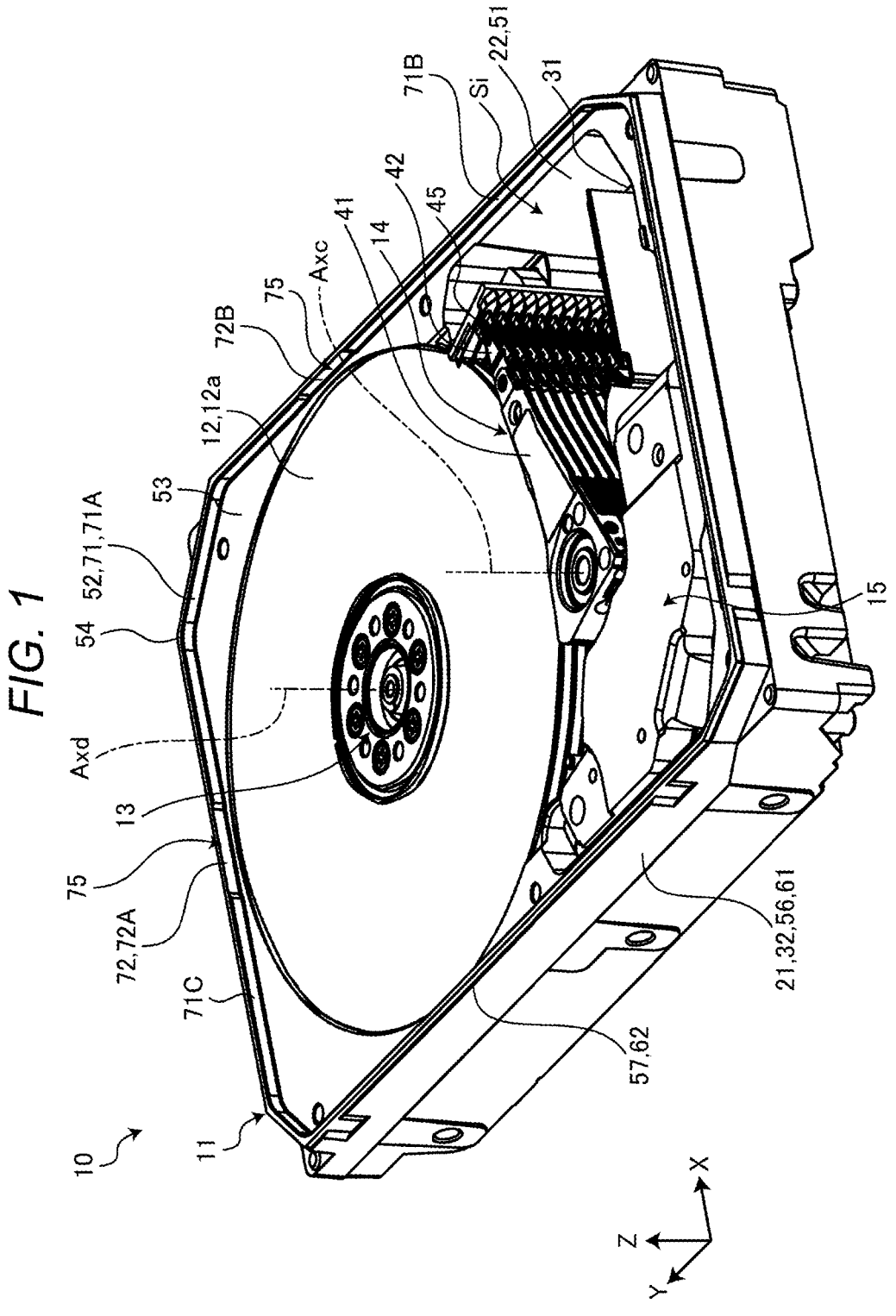
FIG. 1 is a perspective view showing an HDD according to one embodiment.

FIG. 1 is a perspective view showing a hard disk drive (HDD) 10 according to the present embodiment. FIG. 2 is a plan view schematically showing a portion of the HDD 10 according to the present embodiment. FIG. 3 is a cross-sectional view showing a portion of the HDD 10 according to the present embodiment along line F3-F3 in FIG. 2.

As shown in the drawings, an X-axis, a Y-axis, and a Z-axis are defined in this specification for convenience of description. The X-axis, the Y-axis, and the Z-axis are orthogonal to each other. The X-axis is provided along the width of the HDD 10. The Y-axis is provided along the length of the HDD 10. The Z-axis is provided along the thickness of the HDD 10.

Further, in this specification, an X direction, a Y direction, and a Z direction are defined. The X direction is a direction along the X-axis, and includes a +X direction indicated by an arrow on the X-axis and a −X direction which is a direction opposite to the arrow on the X-axis. The Y direction is a direction along the Y-axis, and includes a +Y direction indicated by an arrow on the Y-axis and a −Y direction which is a direction opposite to the arrow on the Y-axis. The Z direction is a direction along the Z-axis and includes a +Z direction indicated by an arrow on the Z-axis and a −Z direction which is a direction opposite to the arrow on the Z-axis.

As shown in FIG. 1, the HDD 10 includes a housing 11, a plurality of magnetic disks 12, a spindle motor 13, a head stack assembly (HSA) 14, and a voice coil motor (VCM) 15. The magnetic disk 12 may also be referred to as a disk or a platter.

Figure 2:
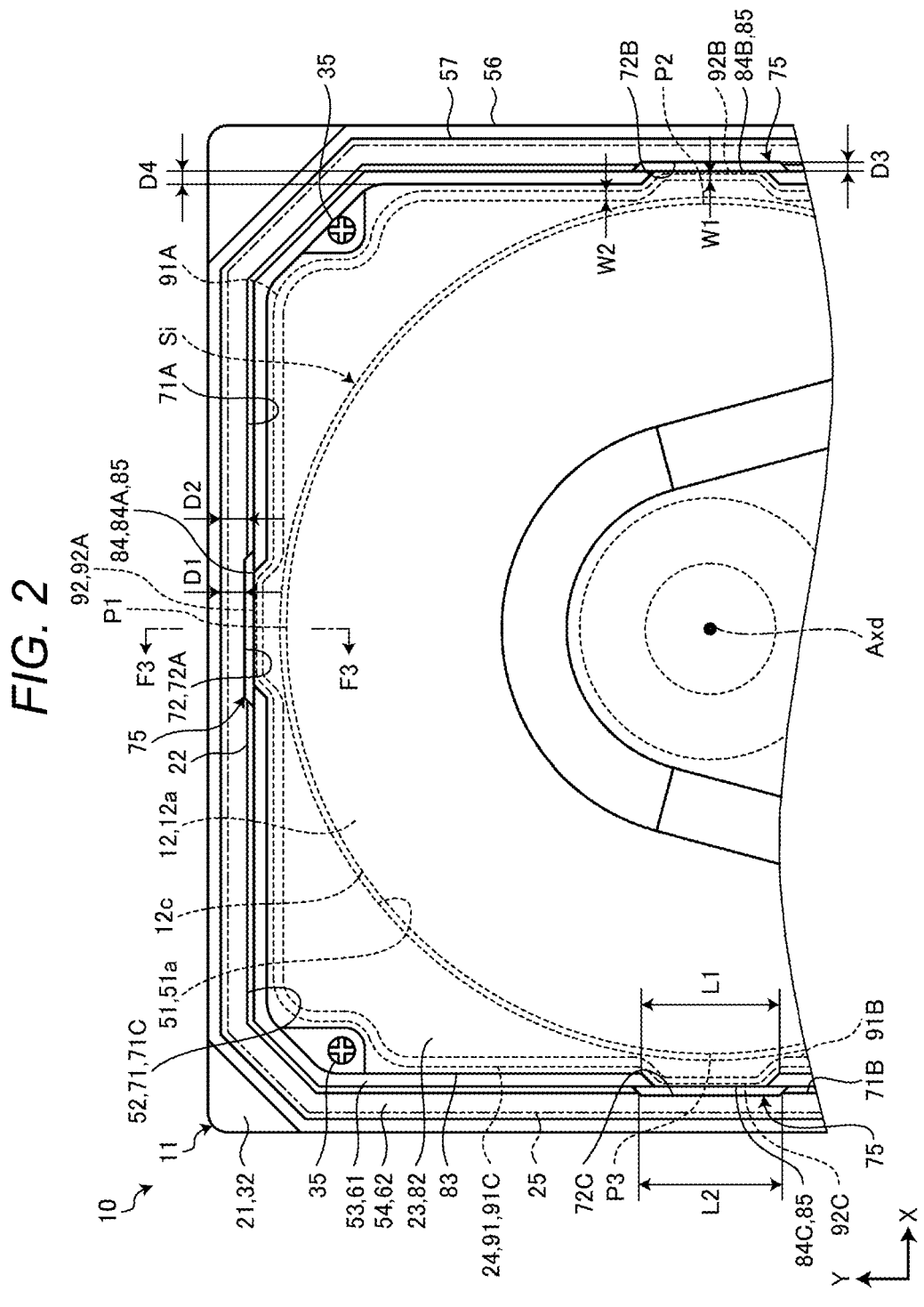
FIG. 2 is a plan view schematically showing a portion of the HDD according to the embodiment.
Figure 3:
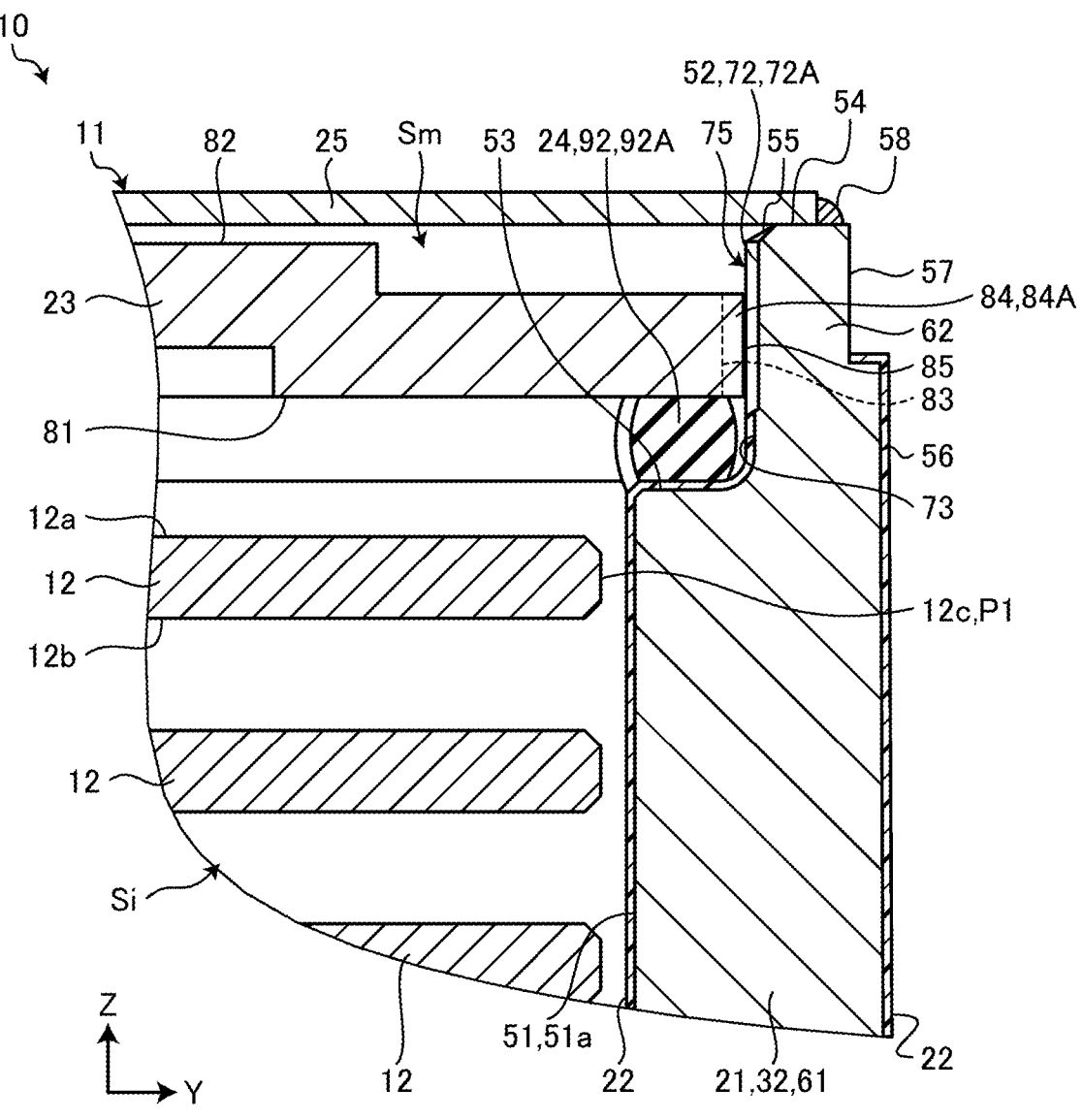
FIG. 3 is a cross-sectional view showing a portion of the HDD according to the embodiment along line F3-F3 in FIG. 2.

As shown in FIG. 3, the housing 11 includes a base 21, a paint film 22, an inner cover 23, a gasket 24, and an outer cover 25. The housing 11 is not limited to this example. The paint film 22 is an example of a film. For convenience of description, FIG. 1 shows the housing 11 with the inner cover 23, the gasket 24, and the outer cover 25 omitted. For convenience of description, FIG. 2 hypothetically shows the outer cover 25 indicated by an alternating two dots-dashed line.

Each of the base 21, the inner cover 23, and the outer cover 25 is made of a metal material such as an aluminum alloy. The base 21, the inner cover 23, and the outer cover 25 may be made of different materials in other embodiments.

The base 21 is formed in the form of a substantially rectangular parallelepiped box that is open in the +Z direction. That is, the base 21 is provided with an internal space Si. The internal space Si communicates with the outside of the base 21 through the end of the base 21 in the +Z direction. A plurality of magnetic disks 12, the spindle motor 13, the HSA 14, and the VCM 15 are disposed in the internal space Si.

As shown in FIG. 1, the base 21 extends in the Y direction (+Y direction and −Y direction). For this reason, the Y direction is referred to as the longitudinal direction of the base 21 and the housing 11. Further, the X direction is referred to as the lateral direction of the base 21 and the housing 11.

The base 21 includes a bottom wall 31 and a side wall 32. The bottom wall 31 is formed in the form of a substantially rectangular plate shape disposed to be substantially orthogonal to the Z direction. The side wall 32 protrudes from the edge of the bottom wall 31 substantially in the +Z direction and is formed in a substantially rectangular frame shape.

The paint film 22 is made of, for example, an epoxy resin. The paint film 22 is not limited to this example. The paint film 22 is provided on the surface of the base 21 by, for example, electrodeposition coating. The paint film 22 has higher corrosion resistance and rust prevention than those of the base 21 and protects the base 21.

As shown in FIG. 2, the inner cover 23 is attached to the side wall 32 with fastening members 35 such as screws. Thereby, the inner cover 23 covers the internal space Si of the base 21. As shown in FIG. 3, the gasket 24 is interposed between the side wall 32 and the inner cover 23, and seals a gap between the side wall 32 and the inner cover 23. The outer cover 25 covers the inner cover 23 and is attached to the side wall 32, for example, by welding. The outer cover 25 may be coupled to other portions of the base 21. That is, the outer cover 25 is coupled to at least a portion of the base 21.

For example, the inner cover 23 and the outer cover 25 are provided with vent holes. After the magnetic disk 12, the spindle motor 13, the HSA 14, and the VCM 15 are disposed in the internal space Si, and the inner cover 23 and outer cover 25 are attached to the base 21, air in the housing 11 is removed through the vent holes. Furthermore, the internal space Si is filled with a gas different from air. The vent hole of the outer cover 25 is airtightly sealed, for example, with a seal.

The gas filled in the internal space Si is, for example, a low-density gas whose density is lower than that of air, an inert gas with low reactivity, or the like. For example, the internal space Si is filled with helium. The internal space Si may be filled with other fluids.

The plurality of magnetic disks 12 are arranged with gaps in the Z direction. The plurality of magnetic disks 12 are formed in a disk shape disposed substantially orthogonal to the Z direction. The diameter of each of the plurality of magnetic disks 12 is, for example, 96 mm or more. The diameter of the magnetic disk 12 is not limited to this example.

Each of the plurality of magnetic disks 12 has two flat surfaces 12a and 12b and an outer peripheral surface 12c. One flat surface 12a faces substantially in the +Z direction. The other flat surface 12b is located on a side opposite to the flat surface 12a and faces substantially in the −Z direction. The outer peripheral surface 12c is a substantially cylindrical curved surface extending substantially in the Z direction between the outer edge of the flat surface 12a and the outer edge of the flat surface 12b. A magnetic recording layer is provided on the flat surfaces 12a and 12b.

The spindle motor 13 in FIG. 1 supports the plurality of magnetic disks 12. The plurality of magnetic disks 12 are held on a hub of the spindle motor 13, for example, by a clamp spring. The spindle motor 13 rotates the plurality of magnetic disks 12 integrally around a central axis Axd. The central axis Axd is an example of a rotation axis.

The central axis Axd is a virtual axis extending substantially in the Z direction. The central axis Axd is, for example, the central axis of the magnetic disk 12 and the spindle motor 13. The central axis Axd is not limited to this example.

The HSA 14 includes a carriage 41 and a plurality of head gimbal assemblies (HGA) 42. The HSA 14 is not limited to this example. The carriage 41 is attached to the base 21 to be rotatable around a central axis Axc. The central axis Axc is a virtual axis extending substantially in the Z direction. That is, the central axis Axc of the carriage 41 and the central axis Axd of the magnetic disk 12 extend substantially parallel to each other. The central axis Axc is spaced apart from the central axis Axd.

The plurality of HGAs 42 are attached to an arm of the carriage 41 and rotate integrally with the carriage 41 around the central axis Axc. The plurality of HGAs 42 are arranged with gaps in the Z direction. Each of the plurality of HGAs 42 includes a magnetic head 45. The magnetic head 45 may also be referred to as a slider.

The magnetic head 45 records and reproduces information for a corresponding magnetic disk among the plurality of magnetic disks 12. In other words, the magnetic head 45 reads and writes information from and to the magnetic disk 12. The carriage 41 moves the magnetic head 45 with respect to the corresponding magnetic disk 12 by rotating around the central axis Axc.

The VCM 15 moves the magnetic head 45 to a desired position along the magnetic disk 12 by rotating the carriage 41 around the central axis Axc. The VCM 15 includes a voice coil, a pair of yokes, and magnets provided on the yokes. The voice coil is held by the carriage 41.

As shown in FIG. 3, the side wall 32 has a first inner surface 51, a second inner surface 52, a supporting surface 53, an end face 54, an inclined surface 55, a first outer surface 56, and a second outer surface 57. The side wall 32 is not limited to this example.

Each of the first inner surface 51, the second inner surface 52, the supporting surface 53, the end face 54, the inclined surface 55, the first outer surface 56, and the second outer surface 57 is formed in a frame shape surrounding the central axes Axc and Axd. The first inner surface 51 and the second inner surface 52 face in a direction substantially orthogonal to the central axis Axd. At least portions of the first inner surface 51 and the second inner surface 52 may face in other directions.

The first inner surface 51 extends from the bottom wall 31 substantially in the +Z direction. The first inner surface 51 surrounds the plurality of magnetic disks 12, at least a portion of the spindle motor 13, at least a portion of the HSA 14, and at least a portion of the VCM 15. That is, in the Z direction, the plurality of magnetic disks 12 are disposed between the end of the first inner surface 51 in the +Z direction and the end of the first inner surface 51 in the −Z direction. A portion of the magnetic disk 12 may protrude in the +Z direction beyond the end of the first inner surface 51 in the +Z direction in other embodiments.

The first inner surface 51 has a curved surface 51a. The curved surface 51a is a substantially cylindrical curved surface that extends along the outer peripheral surface 12c of the magnetic disk 12. In other words, the curved surface 51a of the first inner surface 51 and the outer peripheral surface 12c of the magnetic disk 12 are disposed concentrically (coaxially).

The curved surface 51a functions as a so-called shroud. For this reason, the curved surface 51a regulates a flow of helium in the internal space Si in the vicinity of the magnetic disk 12, thereby preventing a turbulent flow of helium from being generated.

The second inner surface 52 is further away from the bottom wall 31 than the first inner surface 51. Furthermore, the second inner surface 52 is further away from the central axes Axc and Axd than the first inner surface 51 is. For this reason, the second inner surface 52 surrounds the first inner surface 51 in a projection plane viewed in the Z direction (+Z direction or −Z direction) as shown in FIG. 2.

As shown in FIG. 3, the supporting surface 53 and the end face 54 face substantially in the +Z direction. The supporting surface 53 and the end face 54 may be provided with irregularities. That is, at least portions of the supporting surface 53 and the end face 54 may face in other directions.

The supporting surface 53 is connected to the end of the first inner surface 51 in the +Z direction and the end of the second inner surface 52 in the −Z direction. In other words, the supporting surface 53 is provided between the first inner surface 51 and the second inner surface 52. The supporting surface 53 supports the inner cover 23 via the gasket 24. That is, the gasket 24 is interposed between the supporting surface 53 and the inner cover 23.

The second inner surface 52 surrounds the inner cover 23 and the gasket 24 supported by the supporting surface 53. That is, the inner cover 23 and the gasket 24 are disposed between the end of the second inner surface 52 in the +Z direction and the end of the second inner surface 52 in the −Z direction. In other embodiments, a portion of the inner cover 23 may protrude in the +Z direction beyond the end of the second inner surface 52 in the +Z direction, and a portion of the gasket 24 may protrude in the −Z direction beyond the end of the second inner surface 52 in the −Z direction.

The first inner surface 51 is provided in the internal space Si. In other words, the bottom wall 31 and the first inner surface 51 form (define, partition) the internal space Si. The second inner surface 52 is provided in an intermediate space Sm between the inner cover 23 and the outer cover 25. The supporting surface 53 may be partially provided in the internal space Si, or may be partially provided in the intermediate space Sm.

The end face 54 is connected to the end of the second inner surface 52 in the +Z direction. The end face 54 is provided at the end of the side wall 32 in the +Z direction. The side wall 32 may have another portion located at the end of the side wall 32 in the +Z direction.

The outer cover 25 is coupled to the end face 54, for example, by welding. For this purpose, a bead 58 is provided on the end face 54. The bead 58 extends along the end face 54. The outer cover 25 may be coupled to the end face 54 by other methods.

The inclined surface 55 is provided between the second inner surface 52 and the end face 54. That is, the end face 54 is connected to the end of the second inner surface 52 in the +Z direction via the inclined surface 55. The end face 54 may be directly connected to the second inner surface 52 in other embodiments.

The inclined surface 55 extends obliquely between the second inner surface 52 and the end face 54 with respect to the second inner surface 52 and the end face 54. The inclined surface 55 is formed by, for example, a chamfer. The inclined surface 55 is not limited to this example.

The first outer surface 56 is located on a side opposite to the first inner surface 51 and the second inner surface 52. The second outer surface 57 is located on a side opposite to the second inner surface 52. The end of the second outer surface 57 in the +Z direction is connected to the end face

54. The end of the second outer surface 57 in the −Z direction is connected to the first outer surface 56.

The side wall 32 includes a wall 61 and a rib 62. The wall 61 has the first inner surface 51, the supporting surface 53, and a portion of the first outer surface 56. That is, the wall 61 protrudes from the edge of the bottom wall 31 substantially in the +Z direction. The supporting surface 53 is an end face of the wall 61 in the +Z direction. The rib 62 has the second inner surface 52, the end face 54, a portion of the first outer surface 56, and the second outer surface 57. The rib 62 protrudes from the supporting surface 53 of the wall 61 substantially in the +Z direction. The outer cover 25 is welded to the rib 62.

As shown in FIG. 2, the second inner surface 52 includes a covered region 71 and an exposed region 72. As shown in FIG. 3, the second inner surface 52 further includes a lower region 73. The second inner surface 52 is not limited to this example.

As shown in FIG. 2, the covered region 71 and the exposed region 72 are adjacent to each other around the central axis Axd. In other words, the covered region 71 and the exposed region 72 are disposed around the central axis Axd. The covered region 71 and the exposed region 72 are at least partially disposed at substantially the same position (height) in the Z direction.

In the present embodiment, the covered region 71 has three covered regions 71A, 71B, and 71C. The covered region 71 is not limited to this example. The three covered regions 71A, 71B, and 71C are spaced apart from each other around the central axis Axd.

In the present embodiment, the exposed region 72 has three exposed regions 72A, 72B, and 72C. The exposed region 72 is not limited to this example. The three exposed regions 72A, 72B, and 72C are spaced apart from each other around the central axis Axd.

The three covered regions 71A, 71B, and 71C and the three exposed regions 72A, 72B, and 72C are disposed alternately around the central axis Axd. The exposed region 72A is located between the two covered regions 71A and 71C. The exposed region 72B is located between the two covered regions 71A and 71B. The exposed region 72C is located between the two covered regions 71B and 71C.

In the projection plane viewed in the Z direction as shown in FIG. 2, the exposed region 72A faces an end (apex) P1 of the magnetic disk 12 in the +Y direction.

The central axis Axd of the magnetic disk 12 is spaced apart in the +Y direction from the center of the base 21 in the Y direction. That is, the magnetic disk 12 is spaced apart from the end of the base 21 in the −Y direction and closer to the end of the base 21 in the +Y direction. On the other hand, the central axis Axc of the carriage 41 is spaced apart from the end of the base 21 in the +Y direction and closer to the end of the base 21 in the −Y direction.

In the projection plane viewed in the Z direction, the exposed region 72B faces an end P2 of the magnetic disk 12 in the +X direction.

In the projection plane viewed in the Z direction, the exposed region 72C faces an end P3 of the magnetic disk 12 in the −X direction. The two exposed regions 72B and 72C face each other.

The exposed region 72 is closer to the magnetic disk 12 than the covered region 71. For example, the exposed region 72A is a portion of the second inner surface 52 which is closest to the end P1 of the magnetic disk 12. The exposed region 72B is a portion of the second inner surface 52 which is closest to the end P2 of the magnetic disk 12. The exposed region 72C is a portion of the second inner surface 52 which is closest to the end P3 of the magnetic disk 12.

A distance between the exposed region 72A and the magnetic disk 12, a distance between the exposed region 72B and the magnetic disk 12, and a distance between the exposed region 72C and the magnetic disk 12 are substantially equal to each other. The distances may be different from each other in other embodiments.

As shown in FIG. 3, the lower region 73 is provided between the covered region 71 and the supporting surface 53 and between the exposed region 72 and the supporting surface 53. For this reason, the covered region 71 and the exposed region 72 are spaced apart from the supporting surface 53 substantially in the +Z direction. The lower region 73 is provided over the entire circumference around the central axis Axd. The lower region 73 is not limited to this example.

The paint film 22 covers at least a portion of the first inner surface 51, at least a portion of the supporting surface 53, the first outer surface 56, the covered region 71 (covered regions 71A, 71B, and 71C), and at least a portion of the lower region 73. In other words, the paint film 22 adheres to the first inner surface 51, the supporting surface 53, the first outer surface 56, the covered region 71, and the lower region 73.

The paint film 22 does not cover the end face 54, the second outer surface 57, and the exposed region 72 (exposed regions 72A, 72B, and 72C), so as to expose them. In other words, the paint film 22 is spaced apart from the end face 54, the second outer surface 57, and the exposed region 72. The end face 54, the second outer surface 57, and the exposed region 72 may be covered with another component such as the outer cover 25.

For example, the exposed region 72 is formed on the second inner surface 52 by removing the paint film 22 provided on the second inner surface 52 by cutting. A portion of the second inner surface 52 is cut to become the exposed region 72 that is recessed from the other portions, which are the covered region 71 and the lower region 73. For this reason, the exposed region 72 forms a concave portion 75 that opens to the end face 54, the covered region 71, and the lower region 73. The covered region 71, the exposed region 72, and the lower region 73 may form the same plane.

As shown in FIG. 2, the width of the portion of the rib 62 where the exposed region 72 is provided is smaller than the width of a portion of the rib 62 where the covered region 71 is provided. That is, a distance D1 between the exposed region 72 and the second outer surface 57 is smaller than a distance D2 between the covered region 71 and the second outer surface 57. The distances D1 and D2 are not limited to this example.

As shown in FIG. 3, the length of the inclined surface 55 between the exposed region 72 and the end face 54 is smaller than the length of the inclined surface 55 between the covered region 71 and the end face 54. The length of the inclined surface 55 is not limited to this example.

In the Z direction, the inner cover 23 is disposed between the end of the exposed region 72 in the +Z direction and the end of the exposed region 72 in the −Z direction. For this reason, the covered region 71 and the exposed region 72 face the inner cover 23. Furthermore, the inner cover 23 is further away from the supporting surface 53 than the end of the exposed region 72 in the −Z direction.

The lower region 73 faces the gasket 24. In the Z direction, the lower region 73 is spaced apart from the inner cover 23 in the −Z direction. For this reason, the lower region 73 does not face the inner cover 23. The lower region 73 is not limited to this example.

The inner cover 23 has an inner surface 81 and an outer surface 82. As shown in FIG. 2, the inner cover 23 further has a side surface 83 and a convex portion 84. The inner cover 23 is not limited to this example. The inner cover 23 may not be provided with the convex portion 84 in other embodiments.

As shown in FIG. 3, the inner surface 81 faces the bottom wall 31 and the supporting surface 53. The gasket 24 is interposed between the supporting surface 53 and the inner surface 81. The inner surface 81 faces the internal space Si. The outer surface 82 is located on a side opposite to the inner surface 81. The outer surface 82 faces the outer cover 25.

The side surface 83 extends substantially in the Z direction between the outer edge of the inner surface 81 and the outer edge of the outer surface 82. As shown in FIG. 2, the side surface 83 faces in a direction substantially orthogonal to the central axis Axd. The side surface 83 faces the second inner surface 52. In the present embodiment, the side surface 83 faces the paint film 22 on the covered region 71.

The convex portion 84 protrudes from the side surface 83 toward the exposed region 72. In the present embodiment, the convex portion 84 has three convex portions 84A, 84B, and 84C. The convex portion 84 is not limited to this example. The three convex portions 84A, 84B, and 84C are spaced apart from each other around the central axis Axd.

The convex portion 84A protrudes from the side surface 83 toward the exposed region 72A. The convex portion 84B protrudes from the side surface 83 toward the exposed region 72B. The convex portion 84C protrudes from the side surface 83 toward the exposed region 72C.

Each of the convex portions 84A, 84B, and 84C has a side surface 85. The side surface 85 faces the exposed region 72. The side surface 85 of the convex portion 84A extends substantially parallel to the exposed region 72A. The side surface 85 of the convex portion 84B extends substantially parallel to the exposed region 72B. The side surface 85 of the convex portion 84C extends substantially parallel to the exposed region 72C.

A distance D3 between the inner cover 23 and the exposed region 72 is smaller than a distance D4 between the inner cover 23 and the paint film 22. The distance D3 is at least one of a distance between the side surface 85 of the convex portion 84A and the exposed region 72A, a distance between the side surface 85 of the convex portion 84B and the exposed region 72B, and a distance between the side surface 85 of the convex portion 84C and the exposed region 72C. The distance D4 is a distance between the side surface 83 of the inner cover 23 and the paint film 22 on the covered region 71.

Around the central axis Axd, a length L1 of the convex portion 84 is smaller than a length L2 of the exposed region 72. The length L1 is at least one of the length of the convex portion 84A in the X direction, the length of the convex portion 84B in the Y direction, and the length of the convex portion 84C in the Y direction. The length L2 is at least one of the length of the exposed region 72A in the X direction, the length of the exposed region 72B in the Y direction, and the length of the exposed region 72C in the Y direction.

The convex portion 84 is located outside the concave portion 75 and is spaced apart from the paint film 22 and the exposed region 72. The convex portion 84 may be partially accommodated in the concave portion 75 or may be partially in contact with the paint film 22 and the exposed region 72 in other embodiments.

The gasket 24 is made of, for example, synthetic rubber with low helium permeability. The gasket 24 is formed into a frame shape (endless shape) surrounding the central axes Axc and Axd. The gasket 24 includes a thick portion 91 and a thin portion 92.

In the projection plane viewed in the Z direction as shown in FIG. 2, the thick portion 91 is located between the magnetic disk 12 and the paint film 22. The thick portion 91 extends substantially along the side surface 83 of the inner cover 23. However, a portion of the thick portion 91 may be bent, for example, to bypass a fastening member 35 inward.

In the present embodiment, the thick portion 91 has three thick portions 91A, 91B, and 91C. In the projection plane as shown in FIG. 2, the thick portion 91A is located between the magnetic disk 12 and the paint film 22 on the covered region 71A. The thick portion 91B is located between the magnetic disk 12 and the paint film 22 on the covered region 71B. The thick portion 91C is located between the magnetic disk 12 and the paint film 22 on the covered region 71C. The thick portion 91 is not limited to this example.

In the projection plane viewed in the Z direction as shown in FIG. 2, the thin portion 92 is located between the magnetic disk 12 and the exposed region 72. The thin portion 92 is bent to protrude from the thick portion 91 toward the exposed region 72. The thin portion 92 extends along the side surface 85 of the convex portion 84.

In the present embodiment, the thin portion 92 has three thin portions 92A, 92B, and 92C. The three thick portions 91A, 91B, and 91C and the three thin portions 92A, 92B, and 92C are disposed alternately around the central axis Axd. The thin portion 92A is located between the two thick portions 91A and 91C. The thin portion 92B is located between the two thick portions 91A and 91B. The thin portion 92C is located between the two thick portions 91B and 91C.

In the projection plane as shown in FIG. 2, the thin portion 92A is located between the magnetic disk 12 and the exposed region 72A, and is bent to protrude from the thick portions 91A and 91C toward the exposed region 72A. In the projection plane, the thin portion 92B is located between the magnetic disk 12 and the exposed region 72B and is bent to protrude from the thick portions 91A and 91B toward the exposed region 72B. In the projection plane, the thin portion 92C is located between the magnetic disk 12 and the exposed region 72C and is bent to protrude from the thick portions 91B and 91C toward the exposed region 72C. The thin portions 92 are not limited to this example.

In the projection plane viewed in the Z direction as shown in FIG. 2, a width W1 of the gasket 24 between the magnetic disk 12 and the exposed region 72 is narrower than a width W2 of the gasket 24 between the magnetic disk 12 and the paint film 22. In other words, the width W1 of the thin portion 92 is narrower than the width W2 of the thick portion 91. The width of the gasket 24 is not limited to this example.

For example, SFF-8300, which is a form factor for 3.5-inch hard disk drives established by the Form Factor Committee, sets the maximum dimensions of an HDD. That is, the dimensions of the HDD 10 are restricted in the X direction, the Y direction, and the Z direction. Meanwhile, when the diameter of the magnetic disk 12 is increased, the storage capacity of the HDD 10 can be increased.

When the diameter of the magnetic disk 12 is increased while the dimension of the HDD 10 is limited, the side wall 32 becomes thinner in the vicinity of the ends P1, P2, and P3 of the magnetic disk 12. In general, when the width of the end face 54 becomes smaller as the side wall 32 becomes thinner, the strength of welding between the end face 54 and the outer cover 25 may be reduced.

The side wall 32 is protected by the paint film 22. Electrodeposition coating for forming the paint film 22 has lower thickness accuracy than that of, for example, cutting. In order to prevent interference between the inner cover 23 and the paint film 22, the inner cover 23 is spaced apart from the paint film 22 on the covered region 71.

In the present embodiment, the exposed region 72 is located in the vicinity of the ends P1, P2, and P3 of the magnetic disk 12. The exposed region 72 is formed, for example, by cutting, and thus has relatively high dimensional accuracy. For this reason, a distance between the convex portion 84 of the inner cover 23 and the exposed region 72 can be set to be short.

As described above, the exposed region 72 can be close to the inner cover 23. For this reason, the end face 54 connected to the exposed region 72 can also be close to the inner cover 23. In other words, the end face 54 can expand toward the inner cover 23 in the vicinity of the ends P1, P2, and P3 of the magnetic disk 12.

On the other hand, the covered region 71 is covered with the paint film 22 but is spaced apart from the magnetic disk 12. For this reason, even when the covered region 71 is brought close to the magnetic disk 12, the supporting surface 53 can be provided to have a width so that the inner cover 23 and the gasket 24 can be supported. That is, the end face 54 can be expanded toward the inner cover 23 even at a position spaced apart from the ends P1, P2, and P3 of the magnetic disk 12. For this reason, the end face 54 can have a width that stabilizes the strength of welding.

The inner cover 23 covers the magnetic disk 12 disposed in the internal space Si. For this reason, the size of the inner cover 23 and the size of the magnetic disk 12 can be correlated. As described above, the inner cover 23 can be close to the exposed region 72. For this reason, the inner cover 23 and the magnetic disk 12 can be expanded toward the exposed region 72, and the storage capacity of the magnetic disk 12 can be increased.

The exposed region 72 is not limited to be formed by cutting, and may be formed by other methods. For example, when the paint film 22 is provided on the second inner surface 52 by electrocoating, a mask may cover the exposed region 72. The exposed region 72 is exposed by removing the mask.

In the HDD 10 according to the present embodiment described above, the magnetic disk 12 is rotatable around the central axis Axd. The base 21 is provided with the internal space Si in which the magnetic disk 12 is disposed. The base 21 has the first inner surface 51, the supporting surface 53, the second inner surface 52, and the end face 54. The first inner surface 51 surrounds the magnetic disk 12. The supporting surface 53 is connected to the end of the first inner surface 51 in the +Z direction. The second inner surface 52 is further away from the central axis Axd than the first inner surface 51 and is connected to the supporting surface 53. The end face 54 is connected to the end of the second inner surface 52 in the +Z direction. The paint film 22 covers at least a portion of the first inner surface 51, at least a portion of the supporting surface 53, and the covered region 71 of the second inner surface 52. The paint film 22 is spaced apart from the end face 54 and the exposed region 72 of the second inner surface 52. The exposed region 72 is aligned with the covered region 71 around the central axis Axd. The inner cover 23 is supported by the supporting surface 53, surrounded by the second inner surface 52, and covers the internal space Si. The outer cover 25 is coupled to at least a portion of the base 21 and covers the inner cover 23.

The paint film 22 protects a portion of the second inner surface 52, but may vary in thickness. On the other hand, the exposed region 72 of the second inner surface 52 is not covered with the paint film 22 and is exposed. The exposed region 72 can be formed, for example, by removing the paint film 22 by cutting. For this reason, a distance between the exposed region 72 and the inner cover 23 can be set more accurately and smaller than a distance between the paint film 22 and the inner cover 23. Thus, in the HDD 10, the inner cover 23 can be expanded to become close to the exposed region 72. On the other hand, the exposed region 72 can become close to the inner cover 23. Thus, in the HDD 10, the end face 54 connected to the exposed region 72 and the covered region 71 can be expanded toward the inner cover 23. The outer cover 25 is generally coupled to the base 21 at or near the end face 54. For this reason, the strength of coupling between the base 21 and the outer cover 25 can be improved by the expansion of the end face 54. Furthermore, in the HDD 10, the width of the end face 54 is increased, and thus it is possible to prevent the paint film 22 covering the second inner surface 52 from melting during welding. Furthermore, in the covered region 71, the paint film 22 covers the second inner surface 52. For this reason, compared to a case where the paint film 22 is removed over the entire circumference around the central axis Axd, the HDD 10 can reduce work for providing the exposed region 72 and suppress a reduction in the area of the covered region 71 protected by the paint film 22.

The exposed region 72 is closer to the magnetic disk 12 than the covered region 71. As described above, the inner cover 23 can be expanded to become close to the exposed region 72. Thus, in the HDD 10, the diameter and storage capacity of the magnetic disk 12 covered by the inner cover 23 can be increased. Furthermore, the covered region 71 is spaced apart from the magnetic disk 12, and its position can be flexibly set.

The exposed region 72 has the exposed regions 72A, 72B, and 72C spaced apart from each other around the central axis Axd. The base 21 extends in the +Y direction orthogonal to the central axis Axd. In the projection plane viewed in the +Z direction, the exposed region 72A faces toward the end P1 of the magnetic disk 12 in the +Y direction. The exposed region 72B faces toward the end P2 of the magnetic disk 12 in the +X direction orthogonal to the +Z direction and the +Y direction. The exposed region 72C faces the end P3 of the magnetic disk 12 in the –X direction which is opposite to the +X direction.

In general, the end P1 of the magnetic disk 12 in the +Y direction, the end P2 of the magnetic disk 12 in the +X direction, and the end P3 of the magnetic disk 12 in the –X direction are closer to the second inner surface 52 than other parts of the magnetic disk 12. For this reason, although the width of the supporting surface 53 is narrow in the vicinity of each of the ends P1, P2, and P3 of the magnetic disk 12 in the +Y direction, the +X direction, and the –X direction, the exposed regions 72A, 72B, and 72C are provided. A distance between each of the exposed regions 72A, 72B, and 72C and the inner cover 23 can be set to be short. Thus, as described above, in the HDD 10, the diameter of the magnetic disk 12 can be increased, and the strength of coupling between the end face 54 and the outer cover 25 can be improved. Furthermore, the HDD 10 can reduce work for providing the exposed region 72 and suppress a reduction in the area of the covered region 71 protected by the paint film 22.

The base 21 further has the second outer surface 57 on a side opposite to the second inner surface 52. The distance D1 between the exposed region 72 and the second outer surface 57 is smaller than the distance D2 between the covered region 71 and the second outer surface 57.

For example, the exposed region 72 that is exposed without being covered with the paint film 22 can be formed by cutting the paint film 22 and the covered region 71. By forming the exposed region 72, as described above, it is possible to increase the diameter of the magnetic disk 12 and improve the strength of coupling between the end face 54 and the outer cover 25 in the HDD 10. Further, the width of the end face 54 may be set to be wide between the covered region 71 and the second outer surface 57. For this reason, in the HDD 10, it is possible to improve the strength of coupling between the end face 54 and the outer cover 25.

The distance D3 between the inner cover 23 and the exposed region 72 is smaller than the distance D4 between the inner cover 23 and the paint film 22. Thereby, as described above, in the HDD 10, it is possible to increase the diameter of the magnetic disk 12 and to improve the strength of coupling between the end face 54 and the outer cover 25.

The inner cover 23 has the side surface 83 facing the paint film 22 and the convex portion 84 protruding from the side surface 83 toward the exposed region 72. Thereby, in the HDD 10, a distance between the inner cover 23 and the exposed region 72 can be set to be short, and the side surface 83 and the paint film 22 can be prevented from interfering with each other.

Around the central axis Axd, the length L1 of the convex portion 84 is smaller than the length L2 of the exposed region 72. Thereby, the convex portion 84 can be prevented from interfering with the paint film 22 in the vicinity of the exposed region 72.

The gasket 24 is interposed between the supporting surface 53 and the inner cover 23. The gasket 24 includes the thick portion 91 and the thin portion 92. The thick portion 91 is located between the magnetic disk 12 and the paint film 22 on the projection plane viewed in the +Z direction. The thin portion 92 is located between the magnetic disk 12 and each of the exposed regions 72 in the projection plane viewed in the +Z direction, and is bent to protrude from the thick portion 91 toward the exposed regions 72.

The thin portion 92 is bent to be spaced apart from the edge of the supporting surface 53 connected to the first inner surface 51 at positions corresponding to the exposed region 72 and the convex portion 84. Thereby, the gasket 24 can prevent the thin portion 92 from falling off from the supporting surface 53 and can further reliably seal the internal space Si.

The gasket 24 is interposed between the supporting surface 53 and the inner cover 23. In the projection plane viewed in the +Z direction, the width W1 of the gasket 24 between the magnetic disk 12 and the exposed region 72 is narrower than the width W2 of the gasket 24 between the magnetic disk 12 and the paint film 22.

Since the exposed region 72 is closer to the magnetic disk 12 than the covered region 71, the width of the supporting surface 53 is narrower in the vicinity of the exposed region 72. Since the width W1 of the gasket 24 is narrow in the vicinity of the exposed region 72, the gasket 24 can be prevented from falling off from the supporting surface 53 and can more reliably seal the internal space Si.

The outer cover 25 is coupled to the end face 54. As described above, in the HDD 10, the end face 54 can be expanded toward the inner cover 23, and the strength of coupling between the end face 54 and the outer cover 25 can be improved.

The base 21 further has the inclined surface 55. The inclined surface 55 extends obliquely between the second inner surface 52 and the end face 54 with respect to the second inner surface 52 and the end face 54. The length of the inclined surface 55 between the exposed region 72 and the end face 54 is smaller than the length of the inclined surface 55 between the covered region 71 and the end face 54.

The inclined surface 55 is set to be short, and thus it is possible to prevent the width of the end face 54 from decreasing in the vicinity of the exposed region 72. For this reason, in the HDD 10, the strength of coupling between the end face 54 and the outer cover 25 can be improved.

The diameter of the magnetic disk 12 is 96 mm or more. In general, when the diameter of the magnetic disk 12 is set to be large, a distance between the second inner surface 52 and the magnetic disk 12 decreases. However, as described above, in the HDD 10, the diameter of the magnetic disk 12 can be increased, and the strength of coupling between the end face 54 and the outer cover 25 can be improved.

The exposed region 72 is spaced apart from the supporting surface 53 and faces the inner cover 23. Thereby, in the HDD 10, it is possible to prevent the paint film 22 covering the supporting surface 53 from being removed during cutting for forming the exposed region 72 and to prevent the area of the supporting surface 53 protected by the paint film 22 from being reduced.

The inner cover 23 is further away from the supporting surface 53 than the end of the exposed region 72 in the −Z direction opposite to the +Z direction. Thereby, in the HDD 10, it is possible to prevent the inner cover 23 and the paint film 22 provided between the supporting surface 53 and the exposed region 72 from interfering with each other.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A disk device comprising:
a magnetic disk that is rotatable around a rotation axis;
a base that is provided with an internal space in which the magnetic disk is disposed, and has a first inner surface surrounding the magnetic disk, a supporting surface that is connected to an end of the first inner surface in a first direction parallel to the rotation axis, a second inner surface that is further away from the rotation axis than the first inner surface and connected to the supporting surface, and an end face that is connected to an end of the second inner surface in the first direction;
a film that covers at least a portion of the first inner surface, at least a portion of the supporting surface, and a covered region of the second inner surface, and is spaced apart from the end face and an exposed region of the second inner surface;

an inner cover that is supported by the supporting surface, surrounded by the second inner surface, and covering the internal space; and
an outer cover that is coupled to at least a portion of the base and covering the inner cover,
wherein the exposed region is closer to the magnetic disk than the covered region.

2. The disk device according to claim 1, wherein
the exposed region includes a first exposed region, a second exposed region, and a third exposed region which are spaced apart from each other around the rotation axis,
the base extends in a second direction orthogonal to the rotation axis, and
when viewed in the first direction, the first exposed region faces an end of the magnetic disk in the second direction, and the second exposed region faces an end of the magnetic disk in a third direction orthogonal to the first direction and the second direction, and the third exposed region faces an end of the magnetic disk in a fourth direction opposite to the third direction.

3. The disk device according to claim 1, wherein
the base further has an outer surface on a side opposite to the second inner surface, and
a distance between the exposed region and the outer surface is smaller than a distance between the covered region and the outer surface.

4. The disk device according to claim 1, wherein a distance between the inner cover and the exposed region is smaller than a distance between the inner cover and the film.

5. The disk device according to claim 4, wherein the inner cover has a side surface facing the film, and a convex portion protruding from the side surface toward the exposed region in a second direction orthogonal to the first direction.

6. The disk device according to claim 5, wherein a length of the convex portion in a third direction orthogonal to the first and second directions is smaller than a length of the exposed region in the third direction.

7. The disk device according to claim 5, further comprising a gasket that is interposed between the supporting surface and the inner cover, and includes a first portion located between the magnetic disk and the covered region when viewed in the first direction, and a second portion that is located between the magnetic disk and the exposed region when viewed in the first direction and is bent to protrude from the first portion toward the exposed region.

8. The disk device according to claim 1, further comprising a gasket that is interposed between the supporting surface and the inner cover, wherein
when viewed in the first direction, a width of the gasket that is between the magnetic disk and the exposed region is narrower than a width of the gasket that is between the magnetic disk and the covered region.

9. The disk device according to claim 1, wherein the outer cover is coupled to the end face.

10. The disk device according to claim 9, wherein
the base further includes an inclined surface that extends obliquely between the second inner surface and the end face with respect to the second inner surface and the end face, and
a length of the inclined surface between the exposed region and the end face is smaller than a length of the inclined surface between the covered region and the end face.

11. The disk device according to claim 1, wherein a diameter of the magnetic disk is 96 mm or more.

12. The disk device according to claim 1, wherein the exposed region is spaced apart from the supporting surface and faces the inner cover.

13. The disk device according to claim 12, wherein the inner cover is further away from the supporting surface than an end of the exposed region in a direction that is opposite to the first direction.

14. A disk device comprising:

a magnetic disk;

a base having an internal space in which the magnetic disk is disposed, the base including first inner surface surrounding the magnetic disk and extending in a first direction parallel to a rotation axis of the magnetic disk, a supporting surface that is connected to an end of the first inner surface in the first direction and extending in a second direction orthogonal to the first direction, a second inner surface that is further away from the rotation axis than the first inner surface, connected to the supporting surface, and extending in the first direction, and an end face that is connected to an end of the second inner surface in the first direction and extending in the second direction;

a film that covers the first inner surface, the supporting surface, and first, second, and third parts of the second inner surface, each of which extends partially around the rotation axis, and that does not cover the end face, a fourth part of the second inner surface that is between the first and second parts of the second inner surface, a fifth part of the second inner surface that is between the first and third parts of the second inner surface, and a sixth part of the second inner surface that is between the second and third parts of the second inner surface;

an inner cover that is supported by the supporting surface, surrounded by the second inner surface, and covering the internal space of the base; and an outer cover that is coupled to at least a portion of the base and covering the inner cover.

15. The disk device according to claim 14, wherein the inner cover has convex portions, each of which faces the fourth, fifth, and sixth parts of the second inner surface, in a direction that is radially outward with respect to the rotation axis.

16. The disk device according to claim 14, further comprising a gasket that is interposed between the supporting surface and the inner cover.

17. The disk device according to claim 16, wherein the gasket is provided contiguously around the rotation axis and has thick portions that are aligned with the first, second, and third parts of the second inner surface in the first direction and thin portions that are aligned with the fourth, fifth, and sixth parts of the second inner surface in the first direction.

18. The disk device according to claim 14, wherein the outer cover is coupled to the end face.

19. The disk device according to claim 18, wherein the base further includes an inclined surface that extends obliquely between the second inner surface and the end face with respect to the second inner surface and the end face.

* * * * *